United States Patent Office 2,821,535
Patented Jan. 28, 1958

2,821,535

METHOD OF MAKING 2-SULFOETHYL ESTERS OF FATTY ACIDS

Edgar C. Britton and Arthur R. Sexton, Midland, Mich., assignors to The Dow Chemical Company, Midland, Mich., a corporation of Delaware No Drawing. Application February 29, 1956, Serial No. 568,427

10 Claims. (Cl. 260—400)

This invention concerns a method of making 2-sulfoethyl esters of fatty acids. It relates more particularly to an improved procedure for making 2-sulfoethyl esters of fatty acids.

U. S. Patent No. 1,881,172 makes the sodium salt of oleic acid ester of hydroxyethane sulfonic acid (isethionic acid) by reacting sodium hydroxyethane sulfonate and oleic acid chloride at temperatures between 30° and 100° C. The resulting product is kneaded with anhydrous sodium carbonate to neutralize the same, after which the product in pure state is recovered by crystallization from alcohol.

The prior method leaves much to be desired, particularly with regard to manufacture of the ester on a commercial scale. One disadvantage is the difficulty of obtaining complete reaction of the ingredients. This results in a low yield of the desired ester product. The neutralized mass is unstable and requires further steps to obtain a pure product. Other drawbacks include the difficulties of further processing steps which involve handling and the recovery of solvents to obtain a stable product having a desired purity.

It is an object of the invention to provide an improved process for making 2-sulfoethyl esters of fatty acids from salts of hydroxyethane sulfonic acid, i. e. isethionates, and fatty acid chlorides, which process results in substantially complete conversion of the starting materials into the desired fatty acid ester product. Another object is to provide a process for reacting a salt of isethionic acid and a fatty acid chloride to yield a corresponding 2-sulfoethyl fatty acid ester product which is suitable for use as a wetting, dispersing or surface active agent without further purification. Still another object is to provide improvements in a process for making 2-sulfoethyl esters of fatty acids from isethionates and fatty acid chlorides. Other and related objects may appear from the following description of the invention.

According to the invention, the new and improved process comprises reacting under anhydrous or substantially anhydrous conditions, a mixture of a salt of isethionic acid and a fatty acid chloride, i. e. an acyl chloride of a fatty acid, containing from 12 to 18 carbon atoms in the molecule at temperatures not exceeding 170° C., preferably at temperatures between 90° and 115° C. until the exothermic reaction subsides, then at temperatures between 135° and 170° C. while mechanically working the ingredients in admixture with one another and withdrawing the vapors of the by-product hydrogen chloride from the reaction and thereafter neutralizing the reacted material with an alkali.

By carrying out the reaction under anhydrous or substantially anhydrous conditions at temperatures between 135° and 170° C., preferably from 140° to 160° C., while mechanically working the ingredients in intimate admixture with one another and withdrawing the vapors of hydrogen chloride from the reaction, suitably by carrying out the reaction under subatmospheric pressure or by passing a stream of an inert gas, e. g. nitrogen, helium or carbon dioxide, through the reaction zone, at atmospheric pressure or thereabout, or subatmospheric pressure, to displace the by-product hydrogen chloride from the reaction, the ingredients are caused to react readily, rapidly and substantially completely with one another to form the corresponding ester in good yield, and upon neutralizing the reacted material with an alkali results in a free-flowing powder or granular product which is stable and is suitable for use as a surfactant without further purification or treatment.

Salts of isethionic acid to be employed as starting materials are the alkali and alkaline earth metal salts of isethionic acid such as ammonium isethionate, sodium isethionate, potassium isethionate, lithium isethionate, calcium isethionate, magnesium isethionate or barium isethionate. The alkali metal salts of isethionic acid are preferred.

Fatty acid chlorides to be employed in the process are the acyl chlorides of fatty acids containing from 12 to 18 carbon atoms in the molecule such as fatty acids derived from coconut oil (principally lauric acid), oleic acid or stearic acid. Examples of suitable acyl chlorides are lauroyl chloride, oleoyl chloride or stearoyl chloride.

The starting materials are usually employed in stoichiometric proportions, but can be employed in amounts corresponding to from 1 to 1.1, preferably from 1 to 1.04, gram molecular proportions of the salt of isethionic acid per gram molecular proportion of the fatty acid chloride employed.

The reaction can be carried out batchwise or in a continuous manner.

In practice, the salt of isethionic acid and the fatty acid chloride starting materials are mixed together in the desired proportions, suitably, at room temperature or thereabout, and intimately incorporated with one another, e. g. by blending in a mixer. Thereafter, the mixture is heated to about 90° C. to initiate the reaction, which is exothermic. The mixture is maintained at reaction temperatures between 135° and 170° C., preferably under subatmospheric pressures while withdrawing vapors of the by-product hydrogen chloride from the reaction. The hydrogen chloride is usually withdrawn from the reaction at about the rate it is formed. As the reaction proceeds the physical condition of the reaction mass changes from a non-viscous liquid or slurry to a viscous paste and then to a brittle mass which granulates or crumbles readily, when cool and forms a powder or fine particles. The product can be further pulverized or ground to a uniform size. The product is mixed with a powdered alkali such as sodium hydroxide, potassium hydroxide, sodium carbonate or potassium carbonate in amount sufficient to form a final product such that a 10 weight percent solution of the material in water has a pH value between 7 and 8.

The process can be carried out in continuous manner by mixing the starting materials, e. g. acyl chloride of fatty acids derived from coconut oil (principally lauroyl chloride), and sodium isethionate, at room temperature or thereabout in the desired proportions to obtain a non-viscous slurry of the ingredients, feeding the slurry into a reaction zone wherein it is heated at reaction temperatures and mechanically worked by a shearing, cutting and blending action which forwards the mass through said reaction zone, and at the same time the vapors of by-product hydrogen chloride are withdrawn, after which the reacted mass or product is cooled and neutralized with an alkali, e. g. sodium hydroxide, in powdered form, and is broken or crushed to a granular or powdered form.

The invention provides a novel process for readily, rapidly and effectively reacting salts of isethionic acid with fatty acid chlorides to yield the corresponding isethionate ester. The neutralized ester products prepared in accordance with the invention are stable, i. e. are not subject to appreciable change in pH value upon storage, and are useful as wetting agents, dispersing agents, or emulsifying agents.

The following examples illustrate ways in which the principle of the invention has been applied, but are not to be construed as limiting its scope.

*Example 1*

A charge of 228.5 pounds, approximately one pound mole of a mixture of fatty acid chlorides of which lauroyl chloride is the major constituent, containing not more than 30 percent by weight of the adjacent fatty acid chlorides and derived from fatty acids of coconut oil, and 148 pounds, one pound mole, of sodium isethionate (hydroxyethane sulfonic acid sodium salt of the formula

HOCH$_2$CH$_2$SO$_3$Na)

were placed in a mixer having blades adapted to knead and mechanically work the ingredients into a uniform mixture. The mixture was kneaded at room temperature for a few minutes, then was heated to a temperature of 90° C. to initiate the reaction. The temperature of the mixture was allowed to rise spontaneously to 135° to 150° C. under absolute pressures of from 10 to 100 millimeters while withdrawing vapors of hydrogen chloride from the reaction zone, over a period of approximately 45 minutes. The mixture was then cooled while mixing at a temperature between 20° and 25° C. and was discharged from the reaction vessel. The product was obtained as white crumbly flakes. It was analyzed and found to consist of 94.6 percent by weight of the sodium salt of isethionate ester of the fatty acids starting material. It was ground to powdered form and was mixed with powdered sodium hydroxide in amount sufficient to form a substantially neutral final product. An aqueous 10 weight percent solution of the final product in water had a pH value of 7.5 at 25° C. After storage of the dry final product for a period of 30 days at ordinary temperature, an aqueous 10 weight percent solution of the product had a pH value of 7.4.

For purpose of comparison, a similar experiment was carried out by heating the reactants with mixing at temperatures between 105° and 110° C. and evacuating the by-product hydrogen chloride over a period of 75 minutes. The product consisted of only 85 percent by weight of the sodium salt of isethionate ester of the fatty acids starting material. It was ground to a powdered form and was neutralized with finely divided sodium hydroxide. An aqueous 10 weight percent solution of the neutralized product had a pH value of 7.7. After storage of the dry neutralized product for 9 days at ordinary temperatures and pressures, an aqueous 10 weight percent solution of the material had a pH value of only 7.3. After 15 days it was 7.2, and after 27 days the pH value was 7.0.

*Example 2*

A charge of 776.5 grams (2.58 moles) of oleic acid chloride and 455 grams (2.8 moles) of sodium isethionate were mixed in a laboratory blender and heated at temperatures between 110° and 115° C. for a period of 1.25 hours while withdrawing vapors of by-product hydrogen chloride from the reaction and maintaining the mixture under absolute pressures between 10 and 50 millimeters. Thereafter, the mixture was heated at temperatures between 140° and 150° C. with mixing and withdrawing of HCl under reduced pressure for a period of 30 minutes, then was cooled to room temperature. Upon cooling, with agitation, the mixture was obtained as a granular waxy solid. It was analyzed and found to consist of 90.5 percent by weight of the sodium isethionate ester of oleic acid.

In a similar experiment wherein the materials were heated at temperatures between 110° and 115° C. for a period of 5 hours the product contained only 86 percent by weight of the ester.

*Example 3*

A charge of 606 grams (2 moles) of stearic acid chloride and 311 grams (2.1 moles) of sodium isethionate were mixed in a laboratory blender having blades adapted to knead and mechanically work the ingredients. The mixture was kneaded and heated at temperatures between 105° and 110° C. for a period of 15 minutes while withdrawing by-product hydrogen chloride vapors from the reaction under vacuum and maintaining the mixture under absolute pressures of from 10 to 50 millimeters, then was heated at temperatures between 140° and 150° C. for a period of 30 minutes while withdrawing vapor of HCl from the reaction. The product was a granular white material. It was cooled and ground to a powdered form. Powdered sodium hydroxide was incorporated with the product to form a substantially neutral composition. An aqueous 2 weight percent solution of the final composition in water had a pH value of 7.5. After storage of the dry composition for a period of 15 days at ordinary temperatures the pH value of an aqueous 2 percent solution of the material was unchanged.

*Example 4*

A charge of 545 grams (2.3 moles) of fatty acid chlorides, principally lauroyl chloride, similar to that employed in Example 1, and 358 grams (2.5 moles) of ammonium isethionate were mixed in a laboratory blender and heated at temperatures between 140° and 150° C. for a period of 30 minutes at absolute pressures between 10 and 50 millimeters while withdrawing vapors of the by-product hydrogen chloride from the reaction, then was cooled to room temperature. The product was a waxy solid. It crystallized from ethyl alcohol in the form of a fine white powder.

We claim:

1. In a process wherein a fatty acid chloride is reacted with a salt of isethionic acid to yield a corresponding isethionate fatty acid ester, the steps which consist in mechanically working and heating in admixture with one another under substantially anhydrous conditions, a salt of isethionic acid selected from the group consisting of ammonium, alkali metal and alkaline earth metal salts of said acid, and an acid chloride of at least one fatty acid containing from 12 to 18 carbon atoms in the molecule, in proportions corresponding to from 1 to 1.1 gram molecular proportions of the salt of isethionic acid per gram molecular proportion of the fatty acid chloride, at temperatures between 135° and 170° C. and withdrawing vapors of the by-product hydrogen chloride from the reaction at substantially the rate at which it is formed to substantially complete the reaction and thereafter neutralizing the reacted material with an alkali.

2. A process as claimed in claim 1, wherein the reaction is carried out under subatmospheric pressures.

3. A process as claimed in claim 1, wherein an inert gas is fed to the reaction, thereby displacing the by-product hydrogen chloride.

4. A process as claimed in claim 1, wherein the salt of isethionic acid is sodium isethionate.

5. A process as claimed in claim 1, wherein the salt of isethionic acid is ammonium isethionate.

6. A process as claimed in claim 1, wherein the reacted materials are neutralized with an alkali.

7. A process for making a surface active agent which comprises mechanically working and heating in admixture with one another under substantially anhydrous conditions, approximately equimolecular proportions of sodium isethionate and an acyl chloride of at least one fatty acid derived from coconut oil at temperatures between 140° and 160° C. and subatmospheric pressure and withdrawing vapors of the by-product hydrogen chloride from the reaction at substantially the rate at which it is formed to substantially complete the reaction, then cooling the reacted material and neutralizing said material with an alkali.

8. A process as claimed in claim 7, wherein the reaction is carried out in continuous manner.

9. A process for making a surface active agent which comprises mechanically working and heating in admixture with one another under substantially anhydrous conditions, approximately equimolecular proportions of sodium isethionate and oleoyl chloride at temperatures between 140° and 160° C. and subatmospheric pressures and withdrawing vapors of the by-product hydrogen chloride from the reaction at substantially the rate at which it is formed, to substantially complete the reaction then cooling the reacted material and neutralizing said material with an alkali.

10. A process for making a surface active agent which comprises mechanically working and heating in admixture with one another under substantially anhydrous conditions, approximately equimolecular proportions of sodium isethionate and stearoyl chloride at temperatures between 140° and 160° C. and subatmospheric pressure and withdrawing vapors of the by-product hydrogen chloride from the reaction at substantially the rate at which it is formed to substantially complete the reaction, then cooling the reacted material and neutralizing said material with an alkali.

References Cited in the file of this patent

UNITED STATES PATENTS

| Re. 23,823 | Molteni et al., | May 4, 1954 |
| 2,006,309 | Clark | June 25, 1935 |

FOREIGN PATENTS

| 364,107 | Great Britain | Dec. 28, 1931 |

OTHER REFERENCES

Hoyt: German Chemical Developments in Synthetic Detergents and Wetting Agents, 1951, pages 20, 27, 28.